(12) United States Patent
Yazaki et al.

(10) Patent No.: US 8,848,714 B2
(45) Date of Patent: Sep. 30, 2014

(54) PACKET TRANSFER METHOD, PACKET TRANSFER DEVICE, AND PACKET TRANSFER SYSTEM

(75) Inventors: Takeki Yazaki, Kawasaki (JP); Tomoyuki Oku, Kunitachi (JP); Mitsuru Nagasaka, Kokubunji (JP)

(73) Assignee: Alaxala Networks Corporation, Kanagawa (JP)

( * ) Notice: Subject to any disclaimer, the term of this patent is extended or adjusted under 35 U.S.C. 154(b) by 730 days.

(21) Appl. No.: 12/640,592

(22) Filed: Dec. 17, 2009

(65) Prior Publication Data

US 2010/0157830 A1 Jun. 24, 2010

(30) Foreign Application Priority Data

Dec. 22, 2008 (JP) ................................ 2008-325992

(51) Int. Cl.
| | |
|---|---|
| H04L 12/24 | (2006.01) |
| H04L 12/26 | (2006.01) |
| H04L 12/12 | (2006.01) |
| H04L 12/701 | (2013.01) |
| G06F 1/32 | (2006.01) |
| H04L 12/715 | (2013.01) |

(52) U.S. Cl.
CPC ............. *H04L 43/0882* (2013.01); *Y02B 60/32* (2013.01); *H04L 41/0896* (2013.01); *Y02B 60/34* (2013.01); *H04L 12/12* (2013.01); *H04L 45/00* (2013.01); *G06F 1/3209* (2013.01); *H04L 45/04* (2013.01)
USPC ............................ 370/392; 370/221; 370/389

(58) Field of Classification Search
USPC .......................................... 370/221, 389, 392
See application file for complete search history.

(56) References Cited

U.S. PATENT DOCUMENTS

| | | | |
|---|---|---|---|
| 6,553,029 B1 * | 4/2003 | Alexander | .................... 370/389 |
| 6,910,149 B2 * | 6/2005 | Perloff et al. | .................. 714/4.3 |
| 2007/0201380 A1 * | 8/2007 | Ma et al. | ........................ 370/254 |
| 2007/0211628 A1 * | 9/2007 | Ikeda et al. | .................... 370/230 |
| 2007/0230484 A1 * | 10/2007 | Hu et al. | ........................ 370/401 |
| 2008/0037431 A1 * | 2/2008 | Werb et al. | ..................... 370/241 |
| 2010/0011230 A1 * | 1/2010 | Mater | ........................... 713/320 |
| 2010/0273483 A1 * | 10/2010 | Cho et al. | .................. 455/435.1 |
| 2011/0280170 A1 * | 11/2011 | Bowser et al. | ................ 370/311 |
| 2011/0307728 A1 * | 12/2011 | Hatasaki et al. | ............. 713/323 |

FOREIGN PATENT DOCUMENTS

| | | |
|---|---|---|
| JP | 03-145840 | 6/1991 |
| JP | 11-088458 | 3/1999 |
| JP | 11-234344 | 8/1999 |

OTHER PUBLICATIONS

Office Action in JP 2008-325992, dispatched Aug. 28, 2012 (in English, 4 pgs).
Arakawa, Yutaka et al, "Network Reconfigure algorithm for Low Power Consumption," Doc. No. PN2008-16, vol. 108, No. 183, pp. 13-18 of Technical Report Issued on Aug. 1, 2008 by the Institute of Electronics, Information and Communication Engineers. [partial English language translation] (6 pgs.).

* cited by examiner

*Primary Examiner* — Jason Mattis
(74) *Attorney, Agent, or Firm* — Antonelli, Terry, Stout & Kraus, LLP.

(57) ABSTRACT

An edge router measures a traffic volume inputted into a network, and the measurement result is notified to a network management server. If the network management server judges that the notified traffic volume is "smaller" than a capacity of a second core router, it will direct a first core router to shift to a power saving mode. The first core router notifies the edge router of the shift to the power saving mode, and the edge router updates a routing table so that the packet to the first core router may be bypassed to the second core router. The first core router shifts to the power saving mode that does not perform packet transfer, and reduction in electric power is realized.

15 Claims, 9 Drawing Sheets

ROUTING TABLE ~500

| ADDRESS | IP ADDRESS | LINE NUMBER A | LINE NUMBER B | LINE SWITCHING INFORMATION | |
|---|---|---|---|---|---|
| 1 | IP ADDRESS 1 | LINE NUMBER A-1 | LINE NUMBER B-1 | LINE SWITCHING INFORMATION 1 | ~510-1 |
| 2 | IP ADDRESS 2 | LINE NUMBER A-2 | LINE NUMBER B-2 | LINE SWITCHING INFORMATION 2 | ~510-2 |
| 3 | IP ADDRESS 3 | LINE NUMBER A-3 | LINE NUMBER B-3 | LINE SWITCHING INFORMATION 3 | ~510-3 |
| 4 | IP ADDRESS 4 | LINE NUMBER A-4 | LINE NUMBER B-4 | LINE SWITCHING INFORMATION 4 | ~510-4 |
| 5 | IP ADDRESS 5 | LINE NUMBER A-5 | LINE NUMBER B-5 | LINE SWITCHING INFORMATION 5 | ~510-5 |
| 6 | IP ADDRESS 6 | LINE NUMBER A-6 | LINE NUMBER B-6 | LINE SWITCHING INFORMATION 6 | ~510-6 |
| 7 | IP ADDRESS 7 | LINE NUMBER A-7 | LINE NUMBER B-7 | LINE SWITCHING INFORMATION 7 | ~510-7 |
| ----- | ----- | ----- | ----- | ----- | |
| n | IP ADDRESS n | LINE NUMBER A-n | LINE NUMBER B-n | LINE SWITCHING INFORMATION n | ~510-n |

MEMORY FOR TRAFFIC MEASUREMENT 710

| ADDRESS | NUMBER OF BYTES | NUMBER OF PACKETS | |
|---|---|---|---|
| 1 | NUMBER OF BYTES 1 | NUMBER OF PACKETS 1 | 711-1 |
| 2 | NUMBER OF BYTES 2 | NUMBER OF PACKETS 2 | 711-2 |
| 3 | NUMBER OF BYTES 3 | NUMBER OF PACKETS 3 | 711-3 |
| 4 | NUMBER OF BYTES 4 | NUMBER OF PACKETS 4 | 711-4 |
| 5 | NUMBER OF BYTES 5 | NUMBER OF PACKETS 5 | 711-5 |
| 6 | NUMBER OF BYTES 6 | NUMBER OF PACKETS 6 | 711-6 |
| 7 | NUMBER OF BYTES 7 | NUMBER OF PACKETS 7 | 711-7 |

FIG. 10

PACKET TRANSFER METHOD, PACKET TRANSFER DEVICE, AND PACKET TRANSFER SYSTEM

CLAIM OF PRIORITY

The present application claims priority from Japanese patent application JP 2008-325992 filed on Dec. 22, 2008, the content of which is hereby incorporated by reference into this application.

FIELD OF THE INVENTION

The present invention relates to a packet transfer method, a packet transfer device, and a packet transfer system and, more specifically, to a packet transfer method, a packet transfer device, and a packet transfer system in a network that transfers a packet in a power saving manner according to a traffic volume.

BACKGROUND OF THE INVENTION

Against the backdrop of the spread of the Internet, improvement in the speed of the packet transfer device, such as a router and a switch that constitute a network is being sought. Each of the router and the switch is equipped with plural input lines and output lines, determines the output line from a destination address in a header upon input of a packet from the input line (hereinafter, this processing is called an output destination determination processing), and transfers the packet to the output line.

In order to increase the speed of the packet transfer device, it becomes necessary, for example, to increase the number of semiconductor devices, such as ASIC (Application Specific Integrated Circuit), or to raise its frequency, and therefore there is often the case where its power consumption increases with the increase of the speed of the router and the switch. For this reason, it is sought to reduce the power consumption and minimize an increase of electric power accompanying with the increase of the speed.

One of implementation systems for reducing the power consumption of the packet transfer device is, for example, described in JP-A-Hei11 (1999)-088458. This document describes that the packet transfer device thereof monitors existence/absence of a link connection of plural lines with which it is equipped and turns on a power supply of a port control circuit for performing packet processing when the link connection exists. By turning off the power supply of the port control circuit that does not needs to perform the processing, reduction in the power consumption of the packet transfer device is realized.

An other implementation system of reducing the power consumption of the packet transfer device is described in, for example, JP-A-Hei11 (1999)-234344. The packet transfer device of this document has plural interface ports that accommodate lines, an access state monitoring unit for monitoring access states of the interface ports, and a power supply control unit that decides whether the each interface is energized according to a monitoring situation of the access state monitoring unit. By turning off the power supply of the interface port that has no access, the reduction in the power consumption is realized.

SUMMARY OF THE INVENTION

Since in order that a packet transfer device of JP-A-Hei11 (1999)-088458 carry out communications, it needs to have a link connection, even in a case, for example, where packets are being transmitted for communication at an extremely low speed in each line and a load of packet transfer is extremely low, a port control circuit will be turned on. Therefore, there is a case where a power saving effect cannot be attained. Also in a packet transfer device as described in JP-A-Hei11 (1999)-234344, each interface port needs to be energized as long as a packet is transmitted for communication to/from the interface. Therefore, even in the case where the load of the packet transfer device is extremely low, all the interface ports need to be energized, and consequently there is a case where the power saving effect cannot be attained.

For this reason, a network that consists of the packet transfer devices as described in JP-A-Hei11 (1999)-088458 or 2 aiming at lower power consumption has a problem that lower power consumption is not realized even when the load of the packet transfer of the packet transfer device is low and a volume of packet circulating in the network is small.

In view of the above point, the present invention is invented in order to solve the above-mentioned problem.

One of objects of the present invention is to provide a packet transfer method capable of realizing lower power consumption of the network when the volume of packets circulating in the network (traffic volume) is small and the load of the packet transfer of the packet transfer devices that constitute the network is low. Moreover, the present invention has further one object to provide a packet transfer device that implements the packet transfer method.

In order to solve the above-mentioned problem, the packet transfer method of the present invention is a packet transfer method of a network that has plural input lines, plural output lines, and plural packet transfer devices each of which, when a packet is inputted from the input line, transfers the packet to one or the plural output lines, characterized as one of its features in that packet transfer of a few of the packet transfer devices is halted according to the quantity of the packet (traffic volume) circulating in the network, and the packet transfer devices other than the packet transfer device that is halted transfer the packets to the output lines excluding the output line leading to the packet transfer device that is halted.

Moreover, the packet transfer device is equipped with, for example, a power saving control unit for controlling a sleep mode (power saving mode) of the packet transfer device and is characterized as one of its features in that when the packet transfer is halted, the power saving control unit switches a packet transfer function unit excluding a packet receiving/transmission circuit that is necessary for packet input/output to/from the power saving control unit to the sleep mode.

Details of the above-mentioned solution means of the present invention will be clarified with the following columns of "Detailed Description of the Preferred Embodiments" and drawings.

According to first solution means of the present invention, there is provided a packet transfer method in a network equipped with plural packet transfer devices that, when a packet is inputted from the input line, transfers the packet to one or the plural output lines, wherein packet transfer of a few of the packet transfer devices is halted according to a band of the packet circulating in the network, and the packet transfer devices other than the packet transfer device that is halted transfer the packets to the output lines excluding the output line leading to the packet transfer device that is halted.

Moreover, according to second solution means of the present invention, there is provided a packet transfer device that, when a packet is inputted from the input line, transfers the packet to one or the plural output lines, comprising: the power saving control unit for switching the sleep mode and a normal mode according to the band of the packet circulating in a network; the packet receiving/transmission circuit for inputting/outputting the packet; and the packet transfer function unit for transferring the packet inputted to the output line that agrees with its destination; wherein the power saving control unit halts the packet transfer function unit in the sleep mode.

Further according to third solution means of the present invention, there is provided a packet transfer device that includes: plural first transfer devices disposed at the boundary of the Network; at least two second transfer devices disposed between the first transfer devices; and a server; wherein the server determines whether a few of the second transfer devices are shifted to the sleep mode based on the band of the packet circulating in the network and transmits a shift instruction to the sleep mode to the second transfer devices and the plural first transfer devices, each of the first transfer devices changes an output destination of the packet to a line of the second transfer device other than the second transfer device in which the output destination of the packet is halted upon reception of the shift instruction, and the second transfer device halts the packet transfer function unit for transferring the packet upon reception of the shift instruction.

According to the present invention, when the quantity of the packet (traffic volume) circulating in the network is small and the load of the packet transfer of the packet transfer devices that constitute the network is low, it becomes possible to reduce electric power consumed by the network. Moreover, according to the present invention, it becomes possible to provide the packet transfer device that implements the packet transfer method.

DETAILED DESCRIPTION OF THE PREFERRED EMBODIMENTS

1. Network Configuration and Operation of Packet Transfer

An operation of packet transfer in this embodiment will be explained using FIG. 1.

Figure 1:
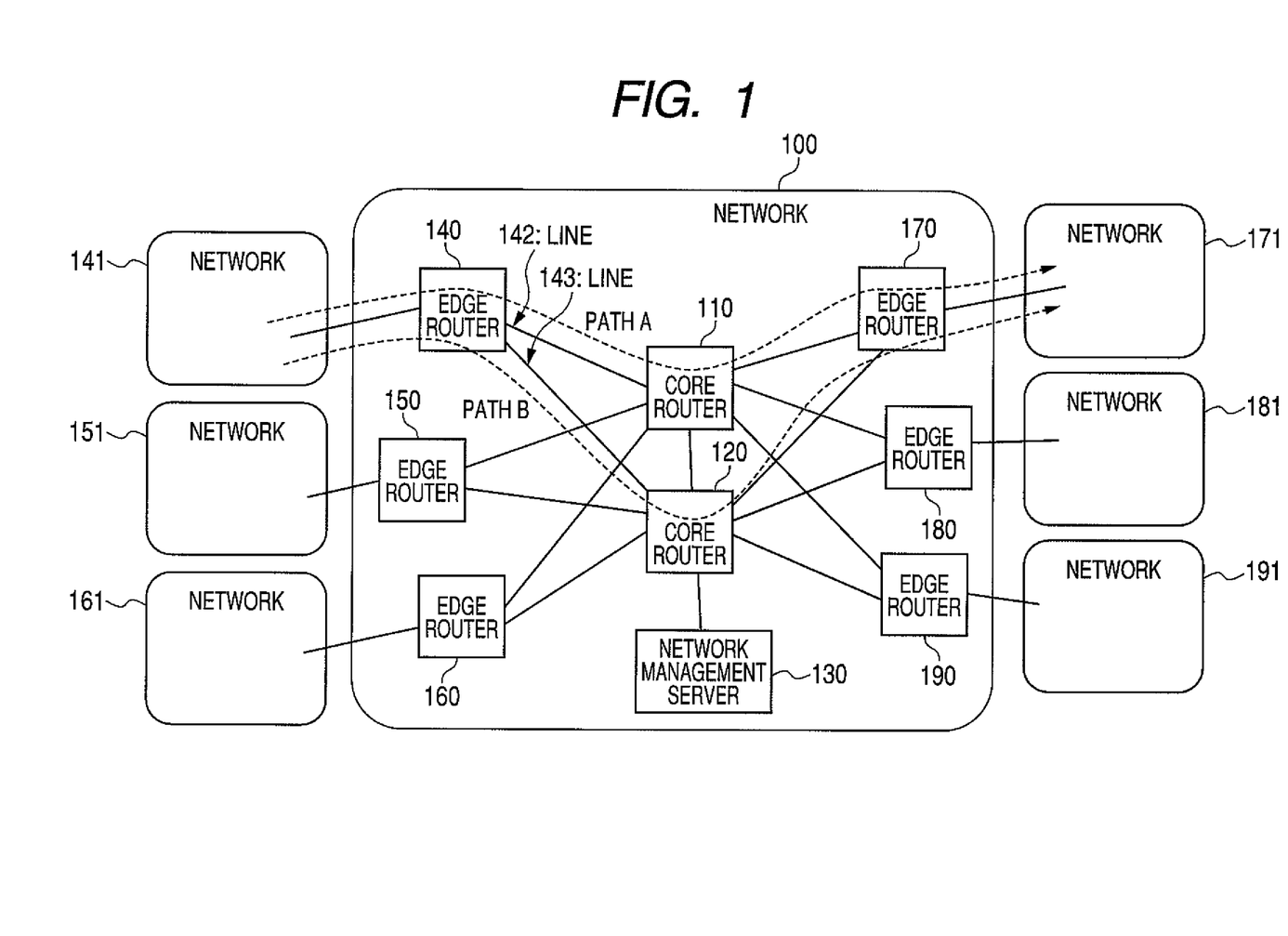
FIG. 1 is a configuration diagram of a network 100.

FIG. 1 shows a configuration diagram of a network 100 that this embodiment assumes and networks 141, 151, 161, 171, 181, and 191 linked by the network 100. The network 100 is equipped with, for example, plural edge routers 140, 150, 160, 170, 180, and 190 (in the example of illustration, six sets), plural core routers 110, 120 (in the example of illustration, two sets) that link together the edge routers with one another, and a network management server 130. For the each router, a path starting from each of the networks 141, 151, 161, 171, 181, and 191 and leading to other networks 141, 151, 161, 171, 181, and 191 via the edge router and the core router is set. FIG. 1 shows a path A starting from the network 141 and leading to the network 171 via the edge router 140, the core router 110, and the edge router 170, and a path B starting from the network 141 and leading to the network 171 via the edge router 140, the core router 120, and the edge router 170, as one example, among them. Incidentally, the proper numbers of the core routers and of the edge routers can be provided regardless of the illustrated example.

Figure 3:
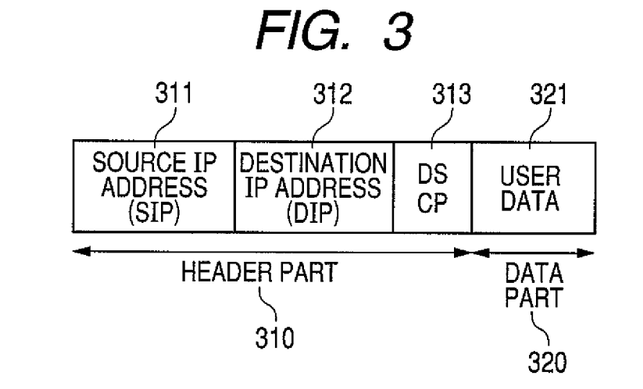
FIG. 3 is a format of a packet that the packet transfer device 200 of this embodiment transmits and receives.
Figure 5:
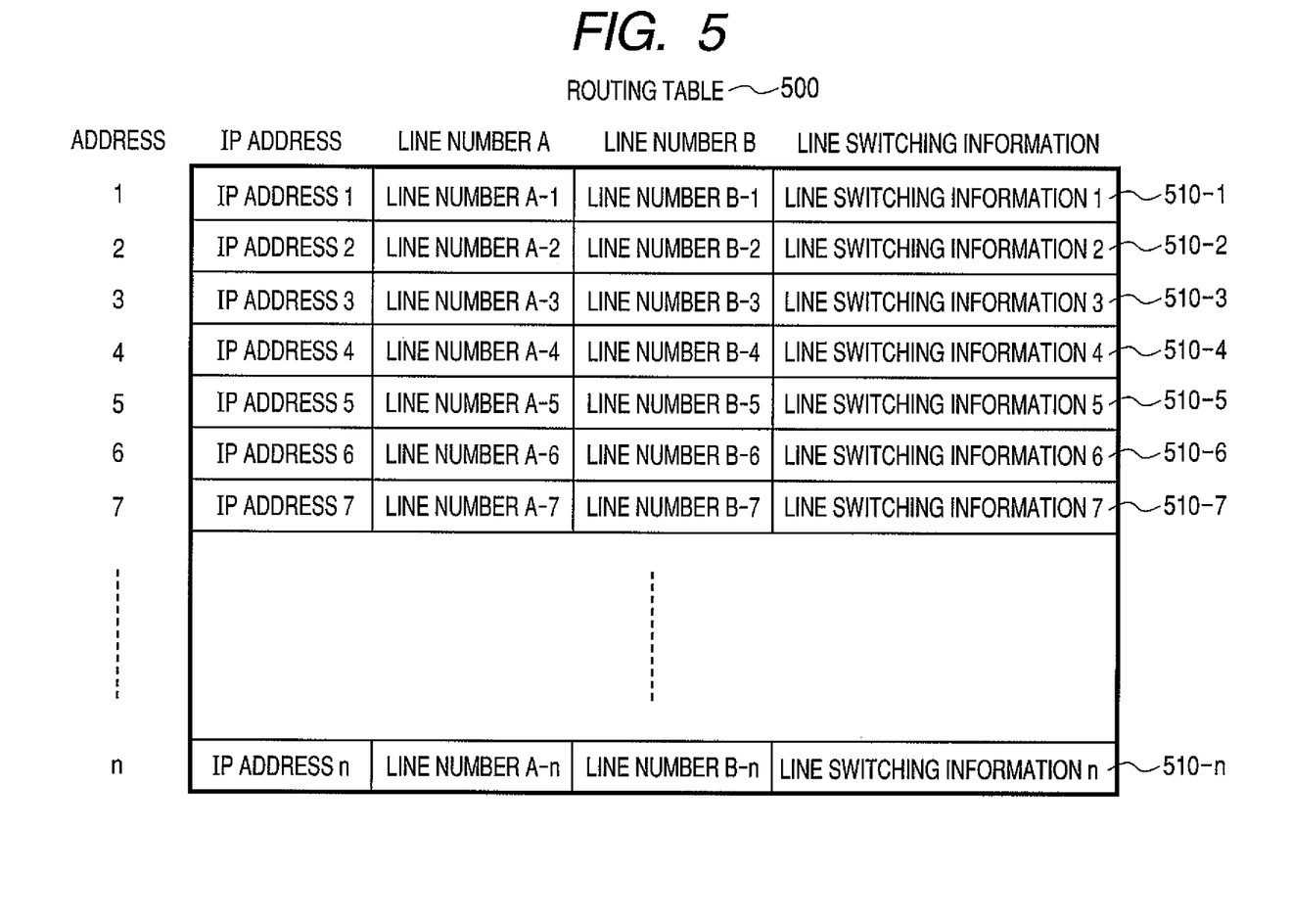
FIG. 5 is a diagram showing a format of a routing table 500 of this embodiment.

Upon reception of the packet that is inputted from the outside of the network 100 and is described in FIG. 3, the each edge router refers to a routing table 500 described in FIG. 5, determines an output destination (an output line) of the packet, and transmits the received packet to the core router 110 or 120 according to the determined output destination. The routing table 500 has plural entries 510 that include IP address, the line numbers A and B for transmitting the packet, and line switching information that indicates which information of a line number A or B is valid.

The line number A of the routing table 500 shows, for example, the output line that outputs the packet at a normal time (when there is not the core router in a sleep mode). For example, the core router 110 and the line number corresponding to the path A or the core router 120 and the line number corresponding to the path B are stored. The line number B shows the line number that outputs the packet, for example, when the core router corresponding to the line number A is in the sleep mode. For example, if the line number A corresponds to the path A, the line number B corresponds to the path B; if the line number A corresponds to the path B, the line number B corresponds to the path A. A pair of the line number A and the line number B corresponds to a pair of the core routers 110, 120. As to the line switching information, that the line number A is valid in an initial state is set, for example.

In the determination of the output destination, the each edge router compares the destination IP address of the packet and the IP address in the entry 510 to check agreement of the both. The each edge router determines that a value of the line number described in a field of the line number A or B indicated by the line switching information in the entry 510 whose IP address is in agreement is a line number of the line into which the packet should be outputted, and transmits it to the output line. The core router that received the packet and the edge router that received the packet transmitted by the core router are each equipped with the same routing table, and can transfer the packet received from the outside of the network 100 to a destination network outside the network 100 by performing the same processing.

The edge router that received the packet from the outside of the network 100 measures the volume of the traffic (=packet) inputting into the network 100 from the outside of the network 100 and notifies the network management server 130 of the traffic volume (called the traffic volume information) that was measured, in addition to the above-mentioned determination and transmission. This traffic volume information includes, for example, the number of packets (packet counts) that the each edge router received at a proper measurement interval that was predetermined (e.g., during 100 ms), and the number of packet bytes that is a sum total of the packet lengths. In doing this, the each edge router transmits a "packet for traffic volume notification." in which the newest traffic volume information is written in user data 321 of the packet described in FIG. 3 to the network management server 130 at a time interval of for example, 100 ms. In doing this, the IP address of the network management server 130 will be described in the destination IP address (DIP) 312, and the IP address assigned to the line in which the packet of the each edge router is transmitted will be described in a source IP address 311. For example, the edge router 140 measures the volume of traffic inputted from the network 141 (traffic measurement), and transmits the packet in which the IP address of the network management server 130 is described in a destination IP address 312 and the IP address assigned to the line 143 of the edge router 140 is described in the source IP address 311 to the line 143. The core router 120 that received the packet will transmit the packet to the network management server 130.

Below, a packet transfer processing of this embodiment will be explained according to FIG. 10.

Figure 10:
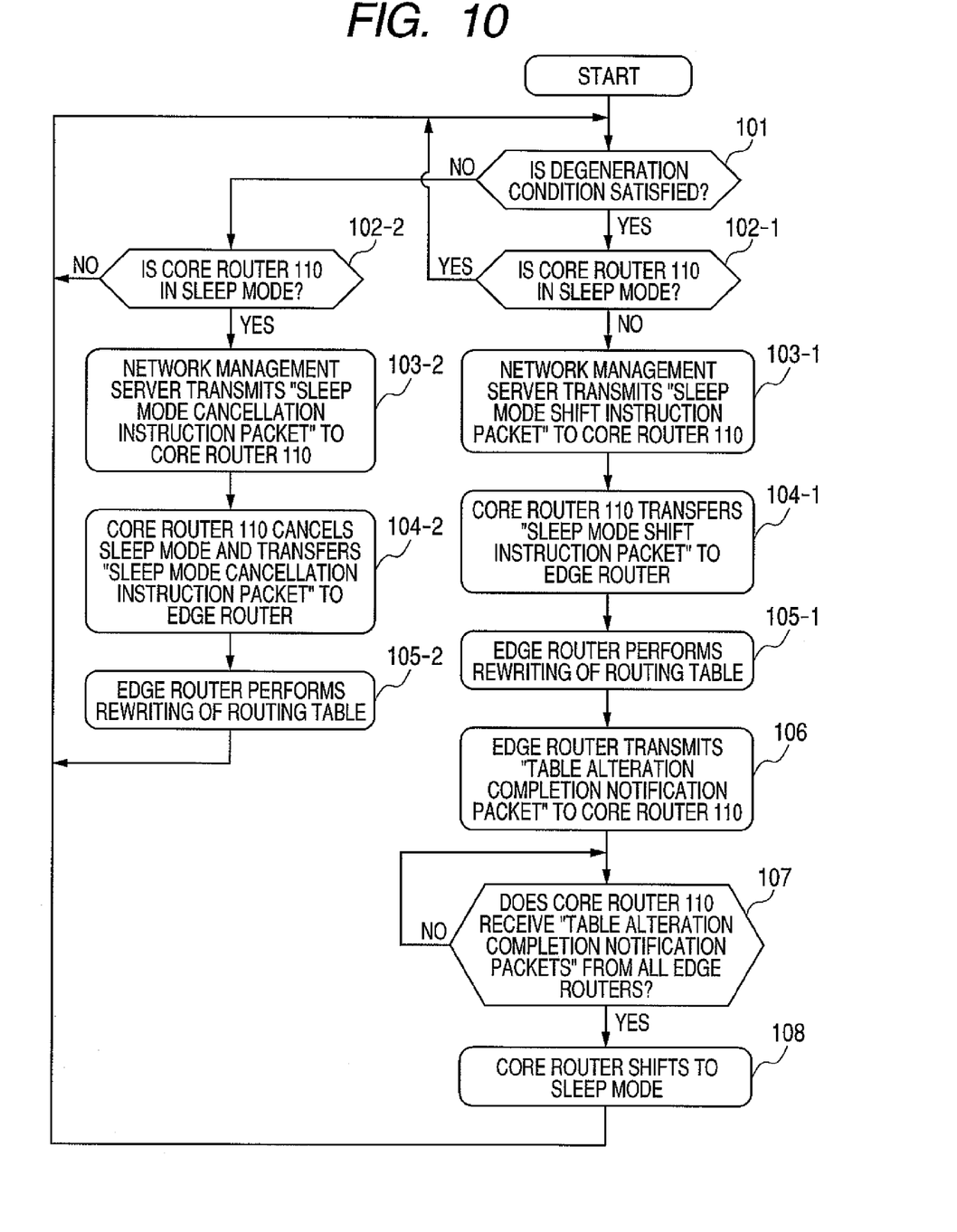
FIG. 10 is a flowchart of a packet transfer processing of this embodiment.

The network management server 130 manages the traffic volume information carried in the packet for traffic volume notification received from the each edge router, and determines whether it satisfies a degenerate condition (Step 101 of FIG. 10). The degenerate condition is a condition by which it is determined whether the core routers for performing the packet transfer is limited to only the core router 120. Below, a case where the packet transfer is performed by the core router 120, and the core router 110 is shifted to the sleep mode will be explained as an example. Incidentally, which core router is to be shifted to the sleep mode can be determined in advance.

As the degenerate condition described above, a condition expressed by the following formula can be used, for example.

Total inflow traffic volume (bps) to network<capacity (bps) of core router 120×P Here, P is a predetermined coefficient not less than 0 and not more than 1. The network management server 130 calculates the total inflow traffic volume (bps) to the network 100 based on a formula: Σ(newest traffic volume information)/measurement interval of traffic volume (for example, 100 ms). Here, Σ means a total sum of the traffic volume information about the edge routers 140, 150, 160, 170, 180, and 190. Moreover, the capacity of the core router 120 means either the transfer capability (bps) of the core router 120 or a total sum of bands of the lines between the edge routers 140, 150, 160, 170, 180, and 180, whichever is smaller. For example, if the lines between the edge routers 140, 150, 160, 170, 180, and 190 and the core router 120 are a gigabit Ethernet (Ethernet is a registered trade mark) of 1 G (bps) and transfer performance of the core router 120 is 5 G(bps), the capacity (bps) of the core router 120 will become 5 G(bps). Moreover, for example, if the transfer performance of the core router 120 is 7 G(bps), the capacity (bps) of the core router 120 will become 6 G(bps). Incidentally, the capacity (bps) of the core router 120 and the measurement interval of the traffic volume can be stored in the network management server 130 in advance. Moreover, the degenerate condition may be determined in the unit of pps based on a total sum of the number of packets.

If the above-mentioned degenerate condition is satisfied, in order to reduce the power consumption of the network 100, the each edge router will transfer the packet to the core router 120, and the core router 110 will shift to the sleep mode of not transferring the packets that the networks 141, 151, 161, 171, 181, and 191 transmit. The shift to this sleep mode is carried out by the following procedure. Incidentally, in the case of the packet (packet whose destination IP address is the IP address assigned to the each line of the core router 110) destined for the core router 110 also at the time of shifting to the sleep mode, it is possible for the core router 110 to perform a time interval processing that will be described later and is based on the reception and the analysis of the packet.

If the network management server 130 judges that the degenerate condition is satisfied (Step 101: Yes), then if the core router 110 is not in the sleep mode (Step 102-1: No), it will transmit to the core router 110 a "sleep mode shift instruction packet" describing an instruction that the core router 110 should shift to the sleep mode in the user data 321 of FIG. 3 (Step 103-1). In doing this, the destination IP address (DIP) 312 will describe the IP address of the core router 110. On the other hand, if the core router 110 is already in the sleep mode (Step 102-1: Yes), the network management server 130 returns to Step 101 and repeats the processing.

The core router 110 having received this packet via the core router 120 transmits the "sleep mode shift instruction packet" to the edge routers 140, 150, 160, 170, 180, and 190 so that they may not transmit any packets to the core router 110 (Step 104-1). The edge router having received this packet performs a rewriting processing of the routing table 500 (Step 105-1). In doing this, the destination IP address (DIP) 312 of the sleep mode shift instruction packet becomes an IP address assigned to a line leading to the core router 110 of the edge router.

In this rewriting processing, the each edge router rewrites the line switching information of the entry 510 such that a value of the line number A is a line leading to the core router 110 and the line switching information has become a value indicating the line number A among the entries 510 of the routing table 500 to a value that specifies the line number B. For example, when the edge router 140 receives the sleep mode shift instruction packet, if the line switching information indicates the line number A, it rewrites the line switching information of the entry 510 in which the IP address corresponding to the network 171 is described to a value that specifies the line number B.

When the rewriting processing is ended, the edge router transmits a "table alteration completion notification packet" that indicates rewriting completion to the core router 110 (Step 106). When the core router 110 receives this packet from each of all the edge routers (Step 107: Yes), it shifts to the sleep mode (Step 108). On the other hand, when the core router 110 does not receive this packet from each of all the edge routers (Step 107: No), it continues the processing of Step 107 until it receives all the "table alteration completion notification packets."

By the above operations, the edge router switches the path A described in FIG. 1 to the path B to realize shifting of the core router 110 to the sleep mode, so that electric power consumed in the network 100 can be reduced.

On the other hand, if the network management server 130 determines that the above-mentioned degenerate condition is "dissatisfied," the edge router 140 will change back the path, cancel the sleep mode, and re-open the traffic transmission to the core router 110. Incidentally, "being dissatisfied" means that a sign of inequality of the above-mentioned formula does not hold: if the total inflow traffic volume (bps) to the network is more than or equal to a value obtained by multiplying the capacity (bps) of the core router 120 by a coefficient P, the network management server 130 can judge that the degenerate condition is "dissatisfied." Incidentally, the condition of shifting to the sleep mode and the condition of canceling the sleep mode may be not the same, and may be otherwise, for example, two coefficients P (P1, P2) may be provided and the shift condition and the cancellation condition may be set differently. First, if the network management server 130 judges that the degenerate condition is "dissatisfied" (Step 101: No), when the core router 110 is in the sleep mode (Step 102-2: Yes), the network management server 130 transmits a "sleep mode cancellation instruction packet" describing that the sleep mode should be cancelled in the user data of FIG. 10 to the core router 110 (Step 103-2). On the other hand, when the core router 110 is not in the sleep mode (Step 102-2: No), the network management server 130 returns to Step 101 and repeats the processing.

The core router 110 that received the packet cancels the sleep mode, and transfers the "sleep mode cancellation instruction packet" to the edge routers 140, 150, 160, 170, 180, and 190 so that the core router may re-open the transmission of the packet to the core router 110 (Step 104-2). The edge router that received the packet performs a rewriting processing of the routing table 500 (Step 105-2). When this is done, the destination IP address (DIP) 312 of the sleep mode cancellation instruction packet becomes an IP address that was assigned to the line leading to the core router 110 of the edge router.

In this rewriting processing, the each edge router rewrites the line switching information having been rewritten at Step 105-1 among pieces of the line switching information that specify the line umber B to a value that specifies the line number A. For example, upon reception of the sleep mode cancellation instruction packet, the edge router 140 rewrites the line switching information of the entry 510 in which the IP address corresponding to the network 171 is described to a value that specifies the line number A.

By performing the above operations, switching from the path B to the path A is realized, so that it is made possible to prevent the traffic from being discarded in the core router 120.

Incidentally, in the above-mentioned example, although the switching from the path A to the path B or from the path B to the path A was performed by traffic measurement made by the edge router 140, it may be all right that a total traffic (=packet) volume that the core router 110 and the core router 120 input is measured and information of the measured traffic volume (traffic volume information) is notified to the network management server 130. Also in this case, similarly, the each core router writes the traffic volume information in the user data 321 of the packet described in FIG. 3, and transmits it to the network management server 130. In doing this, the IP address of the network management server 130 will be described in the destination IP address 312, and the IP address assigned to the line that transmits the packet of the each core router will be described in the source IP address 311. In doing this, the network management server 130 will judge a degenerate state, for example, according to the following formula.

Sum of inflow traffic volume (bps) to core router 110 and core router 120<capacity (bps) of core router 120×P 2. Operation of Edge Router As one example of the edge router, detailed operations of a packet transfer device 200 will be described.

Figure 2:
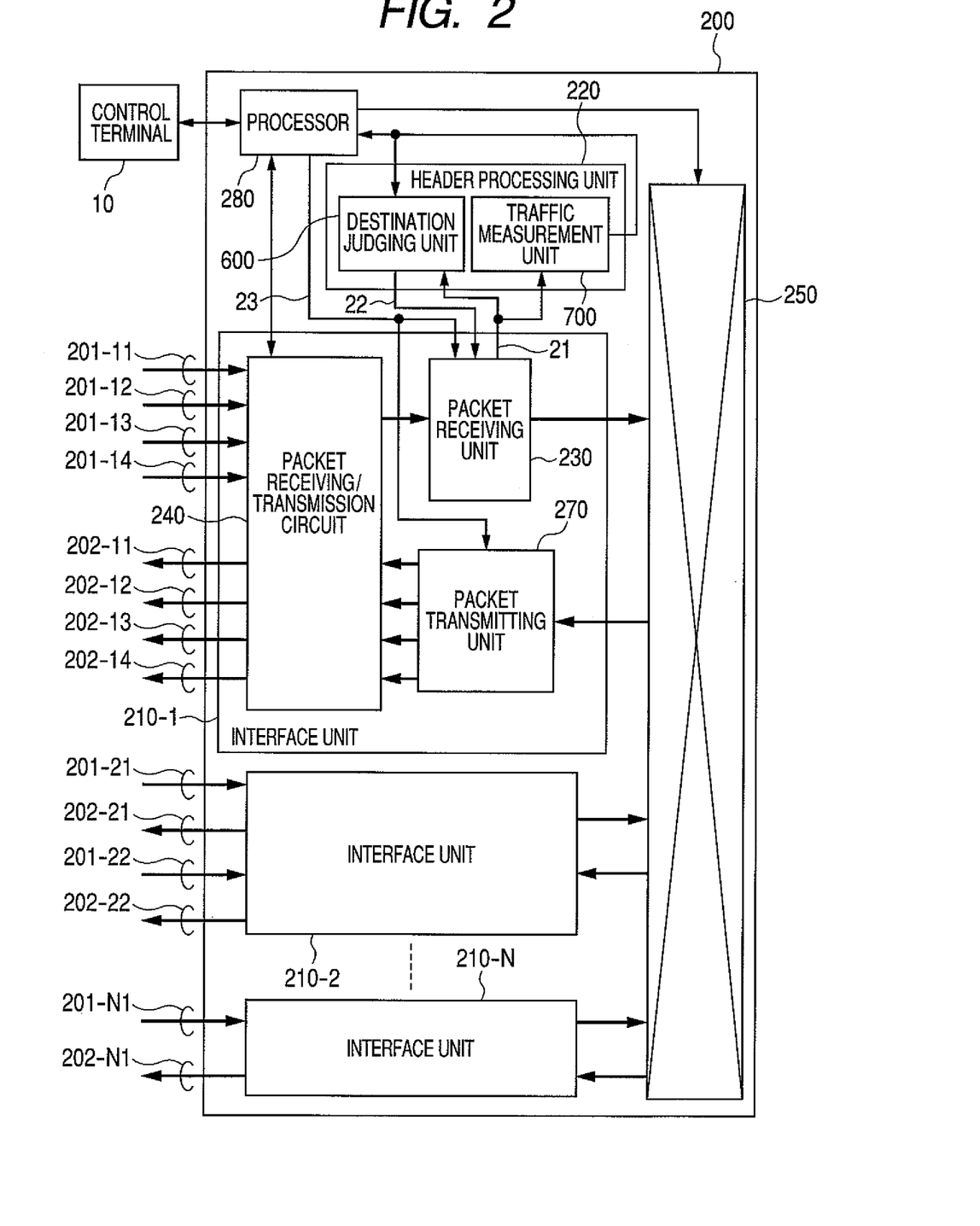
FIG. 2 is a configuration diagram of a packet transfer device 200 of this embodiment.

FIG. 2 shows a block diagram of the packet transfer device 200 of this embodiment.

The packet transfer device 200 is equipped with, for example, N interface units 210-i (i=1–N), M input lines 201-ij (j=1–M) that the interface unit accommodates, output lines 202-ij (j=1–M), a header processing unit 220, packet switch 250 for linking the interface units 210-i, and a processor 280. The processor 280 is connected with, for example, an external control terminal 10, and can notify an instruction of the control terminal 10 to the interface unit 210 or the header processing unit 220, and notify the information of the interface unit 210 to the control terminal 10.

An interface unit 210-1 of the packet transfer device 200 of FIG. 2 has, for example, the input lines 201-11, 201-12, 201-13, and 201-14, and the output lines 202-11, 202-12, 202-13 and 202-14. An interface unit 210-2 has, for example, the input lines 201-21 and 201-22 and the output lines 202-2 and 202-22. An interface unit 210-N has, for example, the input line 201-N1 and the output line 202-N1. Moreover, the interface unit 210-i has, for example, a packet receiving/transmission circuit 240, a packet receiving unit 230 for performing a receiving processing of the packet, and a packet transmission unit 270 for performing a transmitting processing of the packet. The header processing unit 220 has, for example, an destination judging unit 600 and a traffic measurement unit 700.

FIG. 3 shows one example of a format of the packet outputted/inputted from the input line 201-ij and to the output line 202-ij.

The format of this packet includes a header part 310 and a data part 320. The header part 310 includes the source IP address (Source IP Address: hereinafter referred to as an "SIP") 311 that is a transmission source address of a network layer (address of a transmitting terminal), the destination IP address (Destination IP Address: hereinafter referred to as a "DIP") 312 that is a destination address (address of a receiving terminal), and a DSCP (Diffserv Code Point) 313 that indicates transfer priority of the network layer. Moreover, the data part 320 includes the user data 321.

Figure 4:
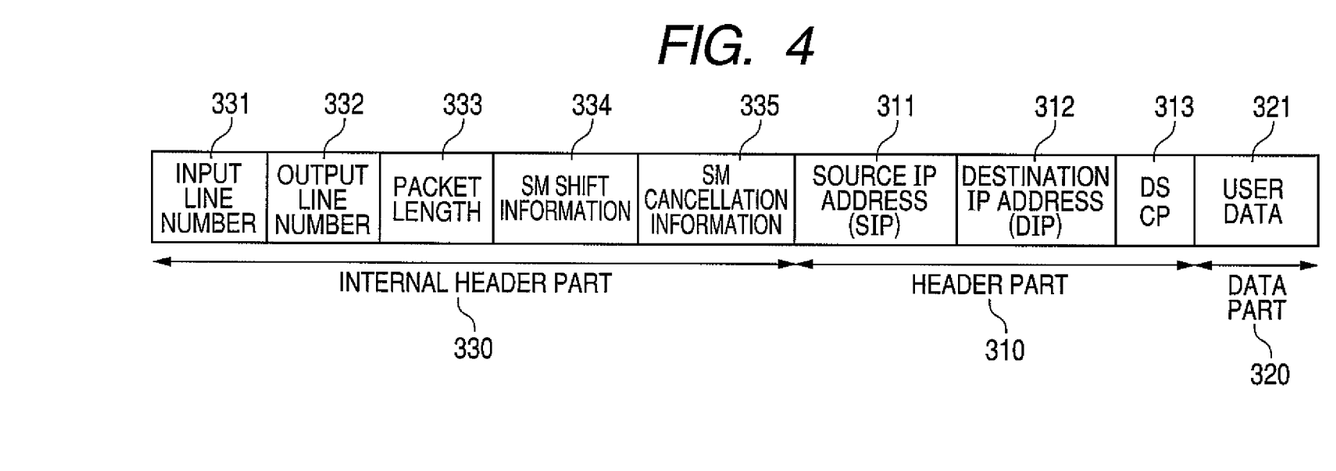
FIG. 4 is a format of a packet in the packet transfer device 200 of this embodiment.

FIG. 4 shows an example of a format of the packet inside the packet transfer device 200 of this embodiment.

The format of the packet further includes an internal header part 330 in addition to the above-mentioned format. This internal header part 330 includes, for example, an input line number 331 that is an identification number of the line into which the packet inputted, an output line number 332 that is an identification number of the line from which the packet is outputted, a packet length 333 showing the number of bytes of the packet, SM shift information 334 showing that it is the sleep mode shift instruction packet, and SM cancellation information 335 showing that it is the sleep mode cancellation instruction packet.

Figure 8:
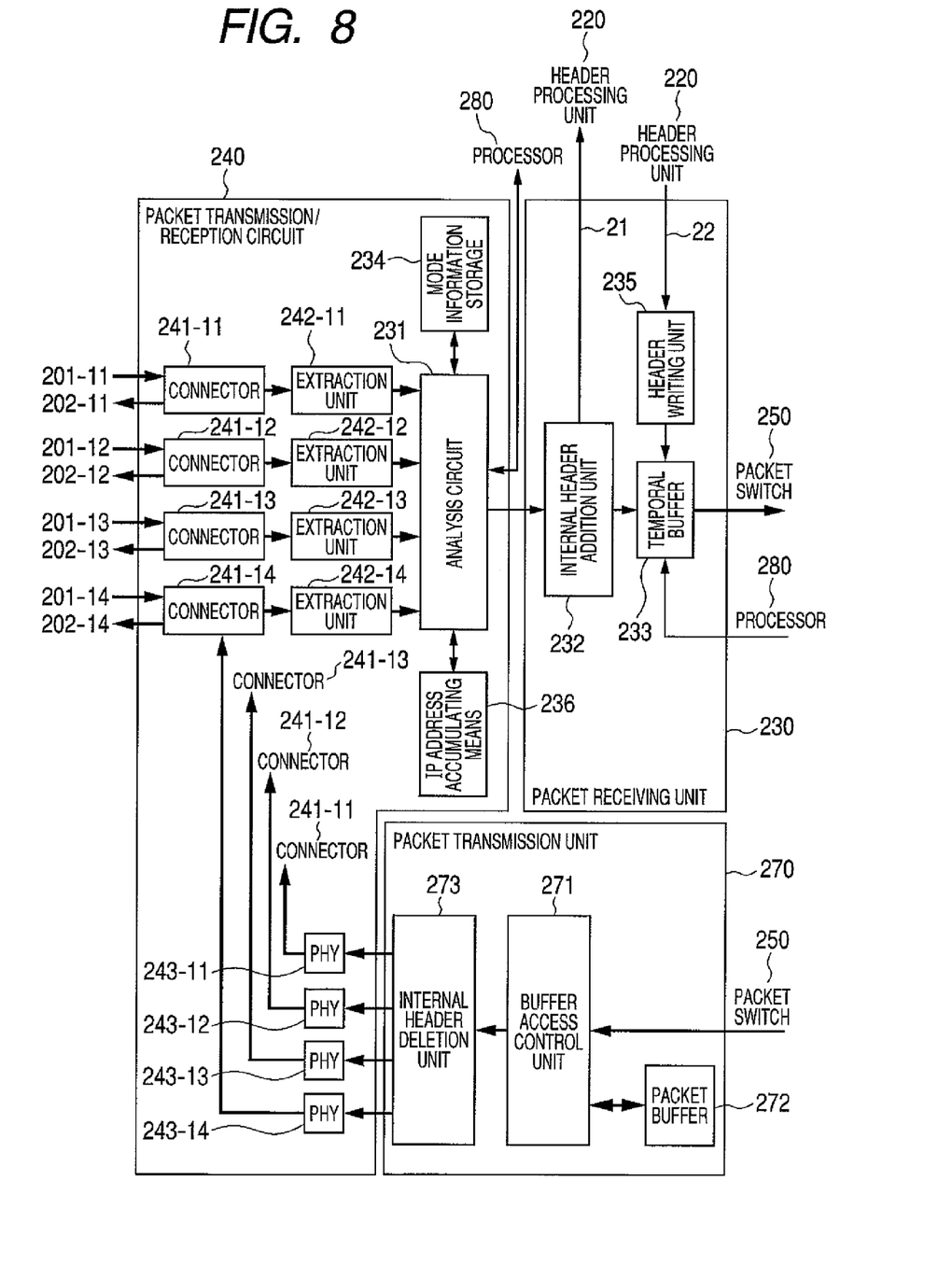
FIG. 8 is a configuration diagram of a packet receiving/transmission circuit 240, a packet receiving unit 230, and a packet transmission unit 270 of this embodiment.

FIG. 8 shows a configuration diagram of the packet receiving/transmission circuit 240, a packet receiving unit 230, and the packet transmission unit 270 of this embodiment.

When the packet is inputted from the input line 201, the packet receiving/transmission circuit 240 shown in FIG. 8 receives the packet. The received packet reaches a packet extraction unit 242 via a connector 241-1j that converts a light or electrical signal received from the input line 201-ij into an electrical signal inside the packet transfer device 200. The packet extraction unit 242 terminates a physical layer that is the first layer of the OSI reference model and transmits the packet to the analysis circuit 231. The analysis circuit 231 is connected with mode information storage 234 for accumulating information as to whether the packet transfer device 200 operates as the edge router or as the core router. In the case where it operates, for example, as the edge router, "0" is stored in advance in the mode information storage 234. A value of the mode information storage 234 can be set in advance, for example, by the control terminal 10 via the processor 280. The analysis circuit 231 transmits the packet to an internal header addition unit 232 of the packet receiving unit 230. Moreover, the analysis circuit 231 compares the IP address that is stored in IP address accumulating means 236 and is assigned to the each input line 201 that is connected to the analysis circuit 231 with the DIP 312 included in the received packet. If the IP address stored in the IP address accumulating means 236 and the DIP 312 included in the received packet are found to be in agreement, the analysis circuit 231 will analyze the user data 321. If the information included in the user data 321 is the "sleep mode shift instruction packet" indicating shift to the sleep mode or the "sleep mode cancellation instruction packet" indicating cancellation of the sleep mode, the analysis circuit 231 will transmit the information to the internal header addition unit 232.

On the other hand, if the IP address stored in the IP address accumulating means 236 and the DIP 312 included in the received packet are not in agreement, the analysis circuit 231 will transmit a fact of being a "normal packet" to the internal header addition unit 232. Moreover, the analysis circuit 231 transmits the number of the inputted input line to the internal header addition unit 232. Incidentally, a value of the IP address accumulating means 236 can be set in advance, for example, by the control terminal 10 via the processor 280.

The internal header addition unit 232 adds the internal header part 330 to the received packet. Furthermore, the internal header addition unit 232 counts the number of bytes of the packer and writes as follows: the counted number of bytes in the packet length 333; the number (input line number) of the input line into which the packet is inputted in the input line number 331; and information based on whether it is the sleep mode shift instruction/analysis instruction packet in the SM shift information 334 and the SM cancellation information 335. The internal header addition unit 232 transfers information of the header 310 and the internal header 330 to the header processing unit 220 as header information 21. Furthermore, it accumulates this packet in a temporal buffer 233.

The destination judging unit 600 of the header processing unit 220 performs an output destination determination processing that determines the output line number of the packet inputted from the DIP 312 in the header information 21. Moreover, the traffic measurement unit 700 of the header processing unit 220 performs traffic measurement for every input line number from the packet length 333 and the input line number 331. The destination judging unit 600 of the header processing unit 220 is equipped with the routing table 500, and determines the output line number corresponding to the DIP 312.

After that, the destination judging unit 600 of the header processing unit 220 transmits the determined output line number to a header writing unit 235 of the packet receiving unit 230 as the output line information 22. Incidentally, details of the header processing unit 220 will be described later. The header writing unit 235 of the packet receiving unit 230 writes the output line number in the output line information. 22 in the output line number 332 of the packet accumulated in the temporal buffer 233, and transmits it to the packet switch 250. Incidentally, if the received packet is the sleep mode shift instruction packet or the cancellation instruction packet, the output line number in the output line information 22 has become the information indicating "packet discard." In doing this, the packet receiving unit 230 discards the packet accumulated in the temporal buffer 233.

The packet switch 250 transmits the received packet to the packet transmission unit 270 of the interface unit 210-i corresponding to the output line number 332. A buffer access control unit 271 of the packet transmission unit 270 shown in FIG. 8 accumulates the packet in a packet buffer 272. When it becomes the output timing of the output line 202, the buffer access control unit 271 sequentially reads from the packet buffer 272 the packet accumulated in the packet buffer 272, and transmits it to an internal header deletion unit 273. The internal header deletion unit 273 deletes the internal header part 330 from the packet being read, and transmits the packet to a line accommodation unit (PHY) 243 corresponding to the output line number 332. Finally the packet is transmitted from the output line 202-ij via the PHY 243 and the connector 241.

Figure 6:
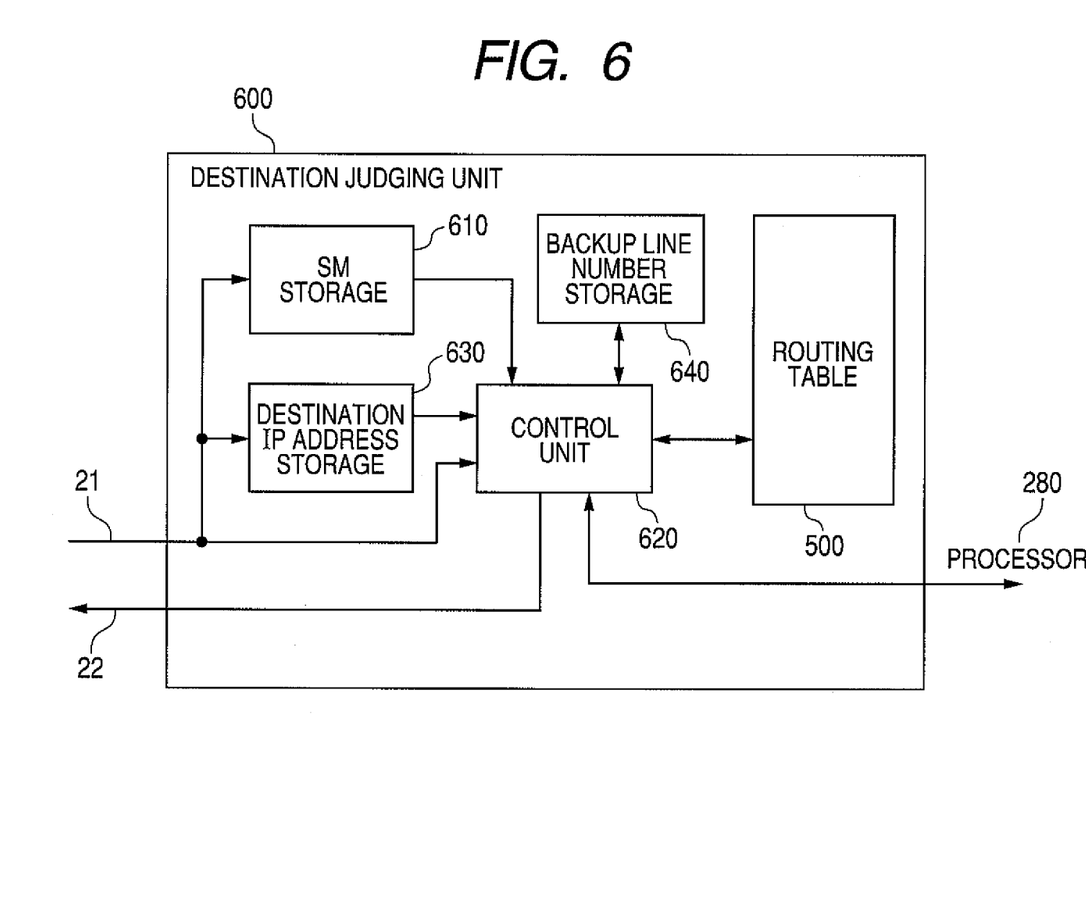
FIG. 6 is a configuration diagram of a destination judging unit 600 of this embodiment.

FIG. 6 shows a configuration diagram of the destination judging unit 600 of this embodiment.

The output destination determination processing that the header processing unit 220 performs will be explained in detail using FIG. 6 that shows the destination judging unit 600 in the header processing unit 220.

When the destination judging unit 600 receives the header information 21, the destination judging unit 600 accumulates the DIP 312 in destination IP address storage 630, and accumulates the SM shift information 334 and the SM cancellation information 335 in SM storage 610. If the SM shift information 334 and the SM cancellation information 335 of the SM storage 610 are disabled, a control unit 620 will perform the output destination determination processing by the DIP 312. For example, the control unit 620 sequentially reads the entry 510 of the routing table 500 shown in FIG. 5 one by one from the smaller address entry 510, and compares it with the DIP 312 of the destination IP address storage 630 to check agreement of the both. If there exists the entry 510 whose IP address agrees with the IP address of the DIP 312 of the destination IP address storage 600, the control unit will refer to the line switching information in the entry 510, determine the line number (line number A or B) specified by the information, and transmit the determined line number to the packet receiving unit 230 as the output line information 22.

When the SM shift information 334 indicates an enabled state (at this time, the SM cancellation information 335 indicates a disabled state), the control unit 620 read all the entries 510 of the routing table 500, and compares the line number A in the entry 510 and the line number stored in backup line number storage 640 to check agreement of the both. The backup line number storage 640 stores the output line number in which the packet will be transmitted at the time when the packet to be bypassed is not yet bypassed. For example, the line number corresponding to the core router that shifts to the sleep mode is stored. The control unit 620 writes back the line switching information in the entry 510 whose line number A agrees with the line number stored in the backup line number storage 640 in the routing table 500 as a value indicating the line number B. For example, when a path is changed from the core router 110 to the core router 120 of FIG. 1 for lower power consumption, a value stored in the backup line number storage 640 becomes a line number of a line 142 of FIG. 1. Next, the control unit 620 transmits information indicating "packet discard" of a packet corresponding to the header information 21 to the packet receiving unit 230 as the output line information 22. This packet will be discarded by the packet receiving unit 230. Incidentally, the value of the backup line number storage 640 can be set in advance, for example, by the control terminal 10 via the processor 280.

The control unit 620 notifies the processor 280 that the table rewriting for sleep mode shift is completed. The processor 280 creates the table alteration completion notification packet such that completion of the table rewriting is described in the user data 321 following the packet format in the packet transfer device 200 described in FIG. 4.

When this was done, the DIP 312 becomes the IP address assigned to the line leading to the edge router equipped with the control unit 620 of the core router 110, the SIP 311 becomes the IP address assigned to the line leading to the line 142 of the core router 110, and the DSCP 313 becomes a value indicating, for example, a highest priority. Moreover, the line number of the line leading to the core router 110 is described in the output line number 332, and is transmitted to the temporal buffer 233 of the packet receiving unit 230. The packet is temporarily accumulated in the temporal buffer 233, and is transmitted to the packet switch 250 by the packet receiving unit 230 like a normal packet, and finally is transmitted to the output line 202-ij. When the core router 110 received this packet from each of all the edge routers, it shifts to the sleep mode.

When the SM cancellation information 335 indicates the enabled state (in this case, the SM shift information 334 indicates the disabled state), the control unit 620 reads all the entries 510 of the routing table 500, and compares the line number A in the entry 510 and the line number described in the backup line number storage 640 to check agreement of the both. The control unit 620 writes back the line switching information in the entry 510 whose line number A and the line number described in the backup line number storage 640 becomes in agreement in the routing table 500 as a value indicating the line number A. Next, the control unit 620 transmits the output line information 22 that was received as the output line information 22 and indicates "packet discard" to the packet receiving unit 230. The packet will be discarded in the packet receiving unit 230. Thus, by changing the line switching information regarding the entry 510 such that the line number of the backup line number storage 640 and the line number A are in agreement, it is possible to return only the line number that was changed at the time of the sleep mode shift to an original line number. Moreover, the configuration of the routing table 500 and alteration of the line number for output are not restricted to the above-mentioned example; other proper configuration and method may be used.

By the above operations, the each edge router implements switching from the path A to the path B when receiving the packet for sleep mode shift and switching from the path B to the path A when the traffic increases and the sleep mode is cancelled.

Figure 7:
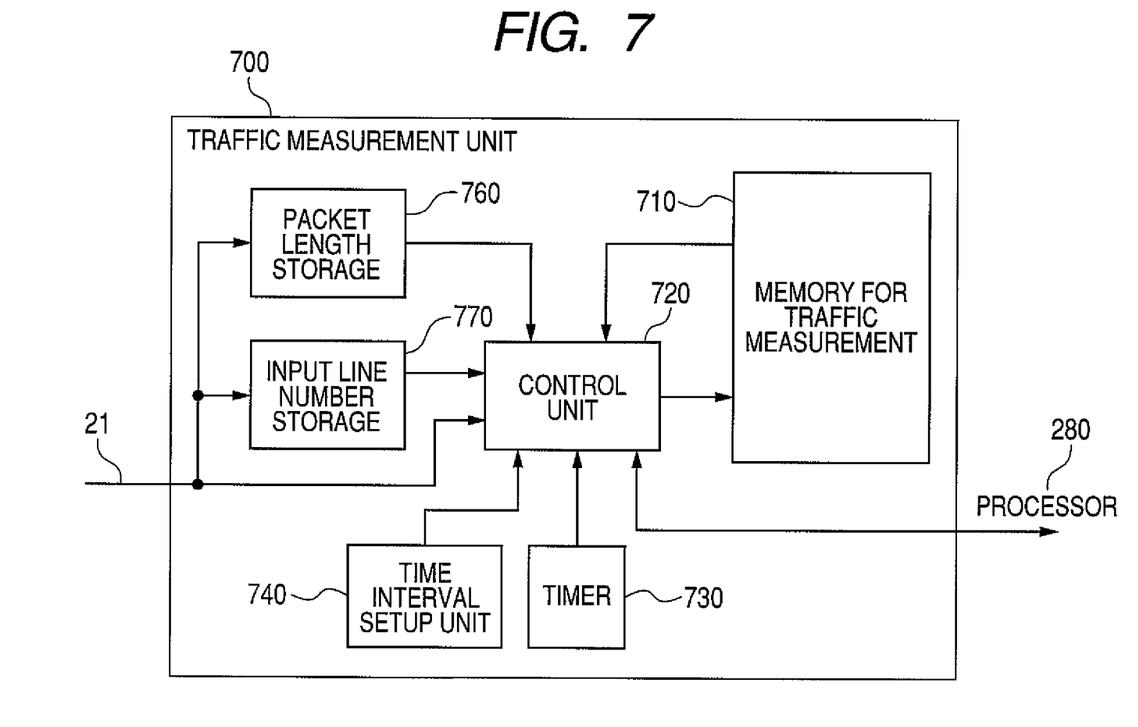
FIG. 7 is a configuration diagram of a traffic measurement unit 700 of this embodiment.

FIG. 7 shows a configuration diagram of the traffic measurement unit 700 of this embodiment.

Traffic measurement that the header processing unit 220 performs will be explained in detail using FIG. 7 showing the traffic measurement unit 700 in the header processing unit 220.

The traffic measurement unit 700 has, for example, memory for traffic measurement 710 for accumulating the measured information, the control unit 720, a timer 730, time interval setup unit 740, packet length storage 760, and input line number storage 770. When the traffic measurement unit 700 receives the header information 21, the traffic measurement unit 700 accumulates the packet length 333 in the packet length storage 760, and accumulates the input line number 331 in the input line number storage 770. The control unit 720 searches the input line number 331 in the input line number storage 770 as an address of the memory for traffic measurement 710, and reads a corresponding entry 711 from the memory for traffic measurement 710.

Figure 9:
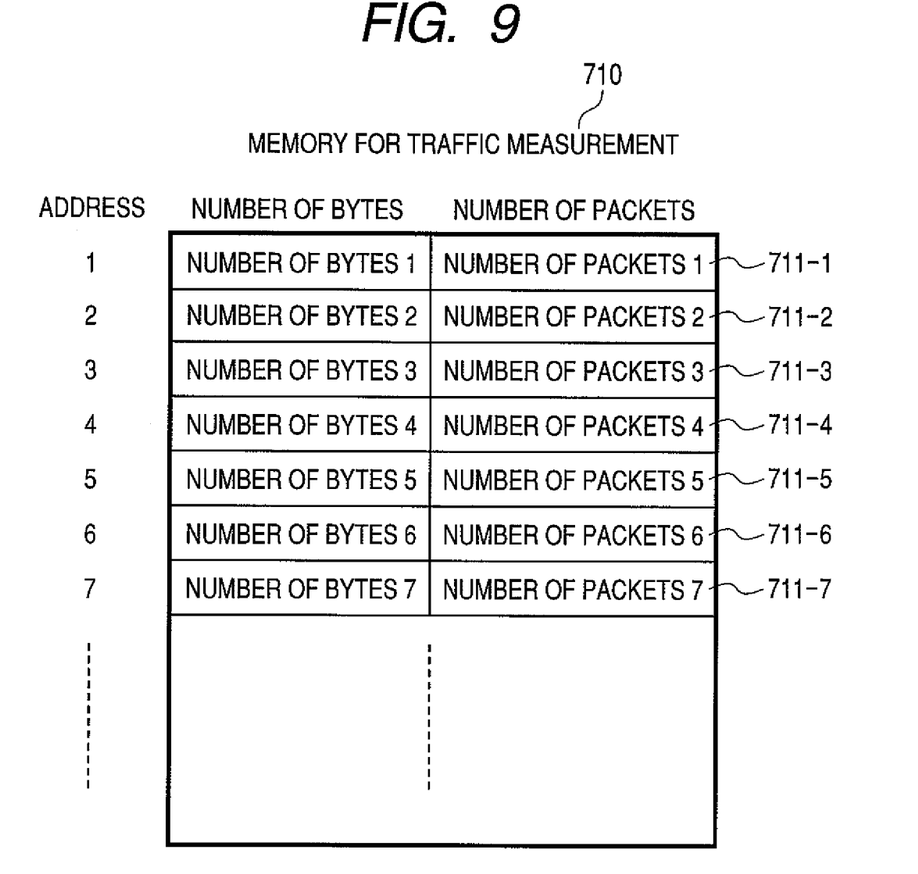
FIG. 9 is a diagram showing a format of memory for traffic measurement 710 of this embodiment.

FIG. 9 shows a format of the memory for traffic measurement 710.

The memory for traffic measurement 710 of FIG. 9 stores information of the number of bytes and the number of packets using, for example, the input line number 331 as an address. The read information is inputted into the control unit 720. The control unit 720 adds a value in the packet length storage 760 to the number of bytes, adds unity to the number of packets, and writes back each updated value in the memory for traffic measurement 710.

On the other hand, regardless (asynchronous) of inputting of the header information 21, zero reset of the memory for traffic measurement 710 is performed. A value of the timer 730 is reset to zero, for example, at the time of powering on of this packet transfer device 200, and the timer 730 counts an elapsed time from a time when it was reset. If the value of the timer 730 exceeds a value (for example, 100 ms) determined by the control terminal 10 in the time interval setup unit 740 in advance, the control unit 720 reads values of the memory for traffic measurement 710, and sets all of them to zero. Moreover, the control unit 720 notifies the processor 280 of the read value. Moreover, in doing this, the control unit 720 resets the value of the timer 730 to zero. By the above operations, it becomes possible for the traffic measurement unit 700 to notify the processor 280 of the number of packets received in a period set by the time interval setup unit 740, and the number of bytes of the received packet.

The processor 280 creates the packet for traffic volume notification following the packet format in the packet transfer device 200 described in FIG. 4. In doing this, the followings are written therein as traffic volume information: the IP address of the network management server 130 as the DIP 312; the IP address assigned to the output line leading to the network management server 130 as the SIP 311; for example, a value indicating the highest priority in the DSCP 313; and information indicating that this packet is the packet for traffic volume notification and a value of the memory for traffic measurement 71 that was read. Moreover, the processor 280 describes the line number of the line leading to the network management server 130 in the output line number 332, and transmits the packet for traffic volume notification to the temporal buffer 233 of the packet receiving unit 230. The packet is transmitted to the packet switch 250 by the packet receiving unit 230 like the normal packet, and is finally transmitted to the output line 202-ij. Incidentally, the processor 280 may obtain the traffic volume information to be transmitted by calculating a total sum of all the entries 711 for the number of bytes and the number of packets of the memory for traffic measurement 710.

3. Operations of Core Router

Operations of the core router 110 will be explained using the packet transfer device 200 described in FIG. 2 and FIG. 8.

When the packet transfer device 200 operates as the core router 110, for example, "1" that indicates that it is the core router is stored in the mode information storage 234 shown in FIG. 8. In the case where the mode information storage 234 is "1," upon input of the packet, the analysis circuit 231 of the packet receiving/transmission circuit 240 compares the IP address determined in advance in the IP address accumulating means 236 by the control terminal 10 and the DIP 312 included in the received packet. The IP address in the IP address accumulating means 236 becomes an IP address assigned to the each input line 201 connected to the analysis circuit 231. When the IP address stored in the IP address accumulating means 236 and the DIP 312 included in the received, packet are in agreement, the analysis circuit 231 transmits the received packet to the processor 280. On the other hand, when the IP address stored in the IP address accumulating means 236 and the DIP 312 included in the received packet are in disagreement, the analysis circuit 231 transmits the packet to the internal header addition unit 232, and the packet is transmitted like the above-mentioned "normal packet."

When the DIP 312 included in the received packet and the IP address stored in the IP address accumulating means 236 are in agreement and the processor 280 receives the packet, the processor 280 analyzes the user data 321 and determines which one it is among the following: (1) the "sleep mode shift instruction packet" sent from the network management server 130; (2) the "sleep mode cancellation instruction packet" sent from the network management server 130, and (3) the "table alteration completion notification packet" sent from the edge-router.

In the case of the "sleep mode shift instruction packet", the processor 280 re-transmits (transfers) the sleep mode shift instruction packet to the edge routers 140, 150, 160, 170, 180, and 190. In doing this, the destination IP address (DIP) 312 of the sleep mode shift instruction packet becomes the IP address assigned to the line leading to the core router 110 of the each edge router, and the output line number 332 becomes the output line number of the line leading to the each edge router. This packet is transmitted to the temporal buffer 233 of the packet receiving unit 230, and is outputted from the output line 202 via the packet switch 250 like the normal packet.

After that, when the table alteration completion notification packets are received from all the edge routers, the core router 110 sifts to the sleep mode.

In the case of the "sleep mode cancellation instruction packet," after the sleep mode is cancelled and the device (core router) is stabilized, the processor 280 re-transmits (transfers) the sleep mode cancellation instruction packet to the edge routers 140, 150, 160, 170, 180, and 190. In doing this, the destination IP address (DIP) 312 of the sleep mode cancellation instruction packet becomes the IP address assigned to the line leading to the core router 110 of the edge router, and the output line number 332 becomes the output line number of the line leading to the each edge router. This packet is transmitted to the temporal buffer 233 of the packet receiving unit 230 and is outputted from the output line 202 via the packet switch 250 like the normal packet.

Details of the sleep mode will be explained below.

In the sleep mode, the power supply of the packet receiving/transmission circuit 240 of the processor 280 of the core router excluding the PHY 243 of FIG. 8 that is a unit existing in the path starting from the input line 201 and leading to the processor 280 is turned on and those of the other units are turned off. For example, in the analysis circuit 231, the mode information storage 234, the IP address accumulating means 236, the connector 241, and the packet extraction unit 242, the power supply, the power supply is turned on; in the header processing unit 220, the packet receiving unit 230, the PHY 243, the packet switch 250, and the packet transmission unit 270, the power supply is turned off. A reason why power supply of a few of the units is not turned off is to enable the processor 280 to receive the sleep mode cancellation instruction packet. Shift to this sleep mode and cancellation therefrom are realized by instructions to the respective units of the processor 280. In the sleep mode, since electric power is supplied only to the units that exist in the path starting from the input line 201 and leading to the processor 280, power consumption of the header processing unit 220 whose power consumption is large, the packet buffer 272/buffer access control unit 271, the packet switch 250, etc. is reduced. For this reason, electric power of the core router 110 and power consumption of the network 100 composed of the core routers 100 are reduced.

The present invention is applicable, for example, to a network in which the packet transfer device determines the output line and transfers the packet to the output, line.

What is claimed is:

1. A packet transfer device that, when a packet is inputted thereinto from an input line, transmit the packet to one or a plurality of output lines, comprising:
    a power saving control unit for switching the packet transfer device between a sleep mode and a normal mode according to an instruction in the received packet circulating in a network;
    a receiving/transmission circuit for inputting and outputting the packet; and
    a packet transfer function unit, including a packet processing unit, a packet transfer switch, and a packet transmitting unit, for transferring an inputted packet to the output line, said packet transfer function unit being located and configured to receive the inputted packet from the packet receiving/transmission circuit, to process the inputted packet receive from the packet receiving/transmission circuit, and to transmit the processed packet back to the receiving/transmission circuit;
    wherein the power saving control unit halts the packet transfer function unit when the packet transfer device is in the sleep mode,
    wherein the receiving/transmission circuit is configured to analyze received data to determine whether the received data includes an instruction data of the sleep mode or normal mode or not, and to transfer the received data to the power saving control unit when the received data includes the instruction data, and
    wherein the receiving/transmission circuit is configured to analyze the received data regardless of whether said packet transfer device is in the sleep mode or not so that said receiving/transmission circuit of said packet transfer device can receive and transfer a sleep mode cancellation signal, even when the packet transfer device is in the sleep mode.

2. The packet transfer device according to claim 1, wherein the packet receiving/transmission circuit includes
    a connector that receives an electrical signal or optical signal from an other device and transmits it as an electrical signal in the packet transfer device;
    a frame extracting unit for extracting a packet from the electrical signal coming from the connector; and
    an analysis circuit that compares a destination address of the packet and an address of a local packet transfer device and transmit the packet whose address agrees with it to the power saving control unit.

3. The packet transfer device according to claim 2, wherein the packet transfer function unit includes a header processing unit for determining the output line of the inputted packet.

4. The packet transfer device according to claim 3, wherein the packet transfer function unit includes:
    a packet buffer for accumulating the inputted packet; and
    a buffer access control unit for accessing the packet buffer.

5. The packet transfer device according to any one of claims 1 to 4,
    wherein when the power saving control unit of one of the packet transfer devices receives a packet that directs the packet transfer device to shift to the sleep mode via the packet receiving/transmission circuit, the power saving control unit makes the packet transfer function unit enter into the sleep mode; and
    wherein when the power saving control unit receives a packet to direct to cancel the sleep mode via the packet receiving/transmission circuit, the power saving control unit makes the packet transfer function unit return from the sleep mode.

6. The packet transfer device according to claim 1,
    wherein the power saving control unit does not halt the packet receiving/transmission circuit in the sleep mode, and can receive a packet that is destined to the address of the power saving control unit's local packet transfer device and directs to cancel the sleep mode.

7. A packet transfer system comprising:
    a plurality of first transfer devices disposed at the boundary of networks;

at least two second transfer device disposed between the first transfer devices, wherein each of the second transfer devices includes a receiving/transmission circuit for inputting and outputting packets, and further includes a packet transfer function unit, including a packet processing unit, a packet transfer switch, and a packet transmitting unit, said packet transfer function unit being located and configured to receive an inputted packet from the packet receiving/transmission circuit, to process the inputted packet received from the packet receiving/transmission circuit, and to transmit the processed packet back to the receiving/transmission circuit; and a server, wherein the server determines whether one or more of the second transfer devices are to be shifted to a sleep mode based on an instruction in a received packet circulating in the network, and transmits a shift instruction to the sleep mode to said one or more of the second transfer devices and the plurality of first transfer devices, wherein each of the first transfer devices changes an output destination of the packet to a line of the second transfer device other than the second transfer device in which the output destination of the packet is halted upon reception of the shift instruction, wherein the one or more second transfer devices halts its packet transfer function unit that transfers the packet upon reception of the shift instruction, and wherein said one or more of the second transfer devices is configured to analyze the received packet regardless of whether said one or more of the second transfer devices is in the sleep mode or not so that said at least one or more second transfer device can receive and transfer a sleep mode cancellation signal, even when said or more of the second transfer devices is in the sleep mode.

8. The packet transfer system according to claim 7, wherein the second transfer devices is a packet transfer system that halts the packet transfer function unit after all of the plurality of first transfer devices changed the output destinations of the packets.

9. The packet transfer system according to claim 7, wherein the server determines the format of the packet that circulates in the network either based on the format of the packet that was determined by the first transfer device and passes through each first transfer device or on the format of the packet that was determined by the second transfer device and passes through each second transfer device.

10. The packet transfer system according to claim 7, wherein the server compares the format of the packet circulating in the network and a threshold based on a communication capacity of the predetermined second transfer device, determines that the predetermined second transfer device is to be shifted to the sleep mode if the format is less than the threshold, and transmits the shift instruction to the sleep mode.

11. The packet transfer system according to claim 7, wherein the server compares the format of the packet circulating in the network and a second threshold based on a communication capacity of the predetermined second transfer device, determines that the sleep mode is to be cancelled if the format is more than or equal to the second threshold, and transmits a cancellation instruction of the sleep mode to the second transfer device that was halted and the plurality of first transfer devices.

12. A packet transfer method in a network comprising a plurality of packet transfer devices for receiving packets, each packet transfer device comprising a power saving control unit for switching the packet transfer device between a sleep mode and a normal mode in accordance with an instruction in a received one of the packets, a receiving/transmission circuit for inputting and outputting the packets and a packet transfer function unit, including a packet processing unit, a packet transfer switch, and a packet transmitting unit, for transferring an inputted one of the packets to an output line, said packet transfer function unit being located and configured to receive an inputted packet from the packet receiving/transmission circuit, to process the inputted packet received from the packet receiving/transmission circuit, and to transmit the processed packet back to the receiving/transmission circuit, wherein the packet transfer function units of one or more of the packet transfer devices switched into the sleep mode are halted, wherein the packet transfer devices, other than the packet transfer devices whose packet transfer function units are halted, transfer the packets to the output lines excluding the output lines leading to the packet transfer devices whose packet transfer function units are halted, wherein each of the receiving/transmission circuits is configured to analyze received data to determine whether the received data includes an instruction data of the sleep mode or the normal mode or not, and to transfer the received data to the power saving control unit when the received data includes the instruction data, and wherein the receiving/transmission circuit of at least one of the packet transfer devices is configured to analyze the received data regardless of whether said one of the packet transfer devices is in the sleep mode or not so that said receiving/transmission circuit of said at least one packet transfer device can receive and transfer a sleep mode cancellation signal, even when the at least one packet transfer device is in the sleep mode.

13. The packet transfer method according to claim 12, wherein ones of the packet transfer devices disposed at a boundary of the network and other networks analyze the format of packets inputted into the network and transmit the result to a server, and wherein the server determines whether packet transfer is to be halted based on the received result and directs the predetermined packet transfer device that is to be halted to halt the packet transfer.

14. The packet transfer method according to claim 12, wherein ones of the packet transfer devices disposed in a core of the network analyze the format of packets circulating in the network, and transmit the result to a server, and wherein the server determines whether the packet transfer is to be halted based on the received result and directs the predetermined packet transfer device to halt the packet transfer.

15. The packet transfer method according to claim 12, wherein when the packet transfer of one or more of the packet transfer devices is halted, the packet transfer devices other than the packet transfer device that is halted rewrite output line information indicating output destinations of the packets to the output lines excluding the output line leading to the packet transfer device that is halted.

* * * * *